United States Patent [19]

May

[11] Patent Number: 4,815,585

[45] Date of Patent: Mar. 28, 1989

[54] SANITARY HANGER BEARING ASSEMBLY

[75] Inventor: Lindy L. May, Strafford, Mo.

[73] Assignee: Custom Metalcraft, Inc., Springfield, Mo.

[21] Appl. No.: 159,387

[22] Filed: Feb. 23, 1988

[51] Int. Cl.$^4$ ............................................. B65G 33/32
[52] U.S. Cl. ...................................... 198/672; 384/434
[58] Field of Search ................ 198/672; 384/428, 443, 384/434, 24, 258

[56] References Cited

U.S. PATENT DOCUMENTS

| | | | |
|---|---|---|---|
| 655,319 | 8/1900 | Wing | 384/443 |
| 1,278,500 | 3/1918 | Pereira et al. | 384/258 |
| 3,765,526 | 10/1973 | Hubbard et al. | 198/672 |
| 3,820,860 | 6/1974 | Stone | 198/672 X |
| 4,384,643 | 5/1983 | Cone | 198/672 |

Primary Examiner—Robert J. Spar
Assistant Examiner—James R. Bidwell
Attorney, Agent, or Firm—Nies, Webner, Kurz & Bergert

[57] ABSTRACT

A sanitary hanger bearing assembly for use in food handling screw conveyors is disclosed. The hanger bearing assembly employs a cam construction and stepped lug arrangement which are of substantial benefit in allowing the unit to be easily disassembled for washdown or maintenance, while holding the parts firmly together when the assembly is in the operating position.

5 Claims, 2 Drawing Sheets

SANITARY HANGER BEARING ASSEMBLY

BACKGROUND AND SUMMARY OF THE INVENTION

The present invention relates to a hanger bearing assembly for use in screw conveyors. More particularly, the present invention relates to a sanitary hanger bearing assembly for use in food handling screw conveyors.

Previous hanger bearing assemblies and related constructions are described in the following U.S. Pat. Nos.: 2,524,948 to Whitney; 3,037,613 to Harmon; 3,709,571 to Croisant et al.; 3,765,526 to Hubbard et al.; 3,820,860 to Stone; 4,025,131 to Bergquist et al.; and 4,384,643 to Cone.

By the present invention, there is provided an improved sanitary hanger bearing assembly which is advantageously employed to support and/or eliminate sag of the screw conveyor auger in food handling applications in which sanitation requirements are such that all parts in the product zone must be capable of being removed without the use of tools. The hanger bearing assembly of the present invention also allows quick and easy bearing replacement in all applications as the assembly can be completely disassembled without the need for tools.

The hanger bearing assembly of the present invention employs a cam construction and a stepped lug arrangement which are of substantial benefit. The use of the cam surface allows the conveyor screw to be lowered for disassembly of the hanger bearing. In addition, the cam surface creates a self-locking orientation of the hanger bearing assembly while in the operating position.

The stepped lug configuration allows the various parts of the hanger bearing to slide relative to one another and also to rotate relative to one another. In addition, the stepped lug allows the parts to be easily disassembled, while holding the parts firmly together when the assembly is in the operating position.

DESCRIPTION OF THE PREFERRED EMBODIMENTS

Figure 2:
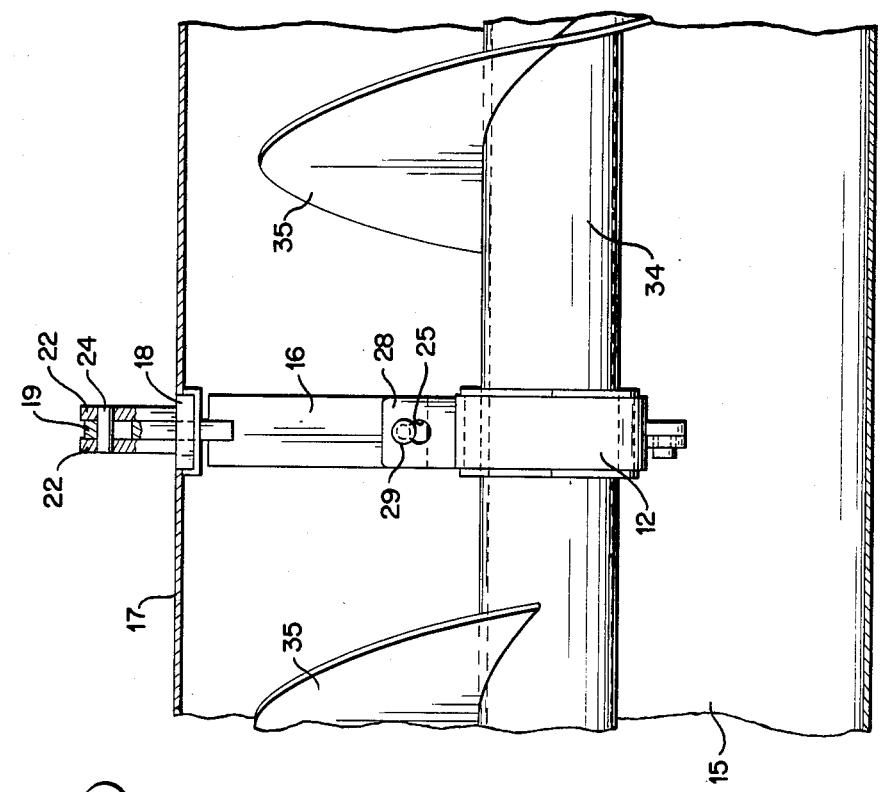
FIG. 2 is a partial cross-sectional view taken along line 2—2 of FIG. 1.
Figure 1:
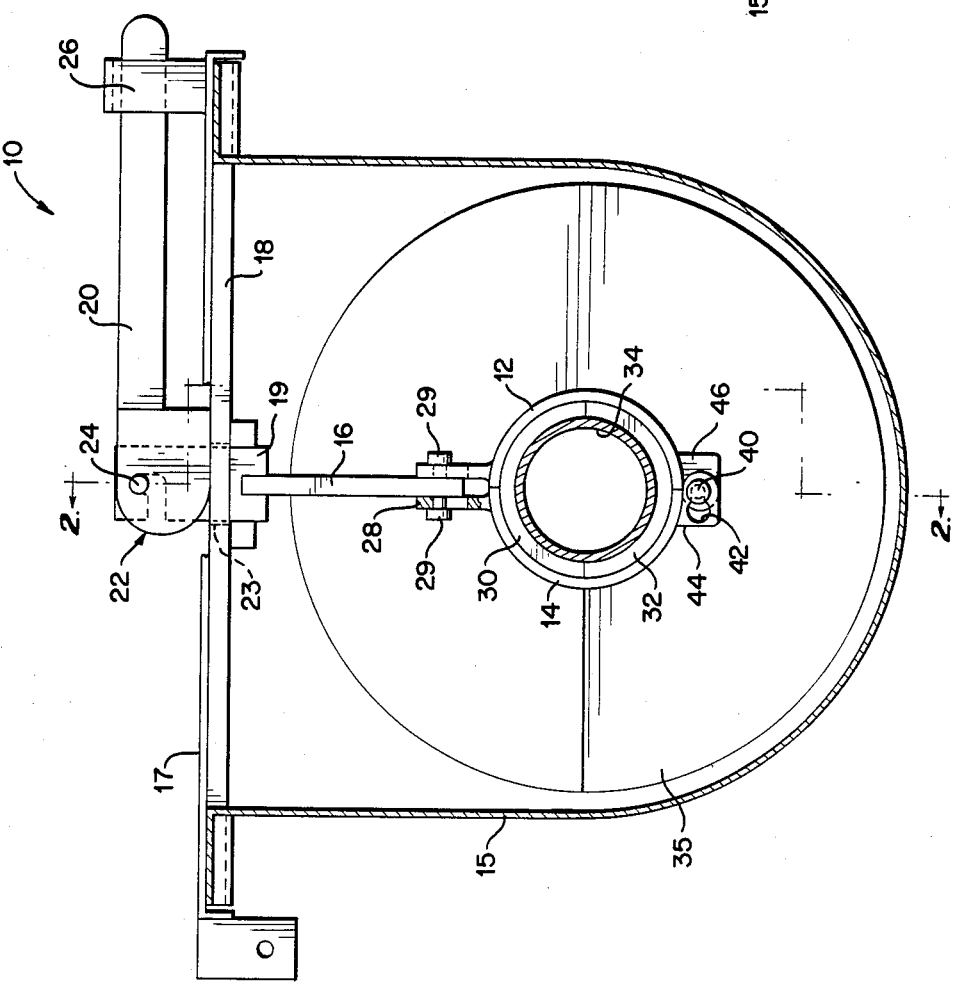
FIG. 1 is a cross sectional view showing the hanger bearing assembly of the present invention as installed in a screw conveyor apparatus.

In the embodiment of the present invention as shown in FIGS. 1 through 5 there is provided a sanitary hanger bearing assembly 10 which includes arcuate bearing sleeve halves 12 and 14 secured to lower lifting rod 16 which is attached to upper lifting rod 19 slidably mounted in slot 23 of cross bar 18 for vertical movement relative to the cross bar 18. The bearing assembly 10 is shown in FIGS. 1 and 2 as installed in a trough 15 with cover 17.

A handle 20 with lifting cam surface 22 and lifting lug 24 is positioned as shown in FIG. 1 with the outer end of the handle 20 being secured in a cover safety bracket 26 as shown. In one embodiment, as the cover 17 is shut, the bracket 26 fits over the handle 20, preventing the handle 20 from being inadvertently placed in the "disassemble" position (to lower the bearing assembly).

In the operation of the assembly 10, the handle 20 is rotated to the opposite side to lower the lifting rod 16. The cam surface 22 is designed such that, upon initial rotation of the handle 20 from the "operating" position to the "disassemble" position, the lifting rod 16 will be raised a small amount by the action of the handle 20 before it will be lowered. This concept utilizes the weight of the conveyor screw 34 to "self-lock" the bearing assembly 10 together while it is in the "operating" position.

As the handle 20 is rotated, the cam surface 22 is shaped so as to allow the rod 16 to be lowered an initial amount which results in the screw conveyor shaft 34 with auger flighting 35 being lowered sufficiently that the flighting 35 is supported by the interior bottom surface of the trough 15. At this point, the weight of the conveyor shaft 34 and flighting 35 is no longer supported by the lifting rod 16.

Figure 3:
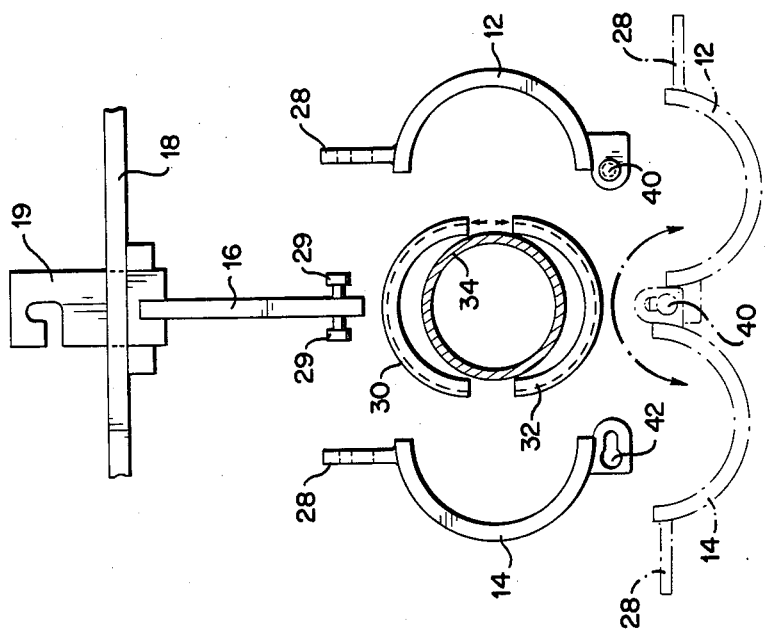
FIGS. 3 through 5 show various steps in the procedure for disassembly of the hanger bearing of FIG. 1.
Figure 4:
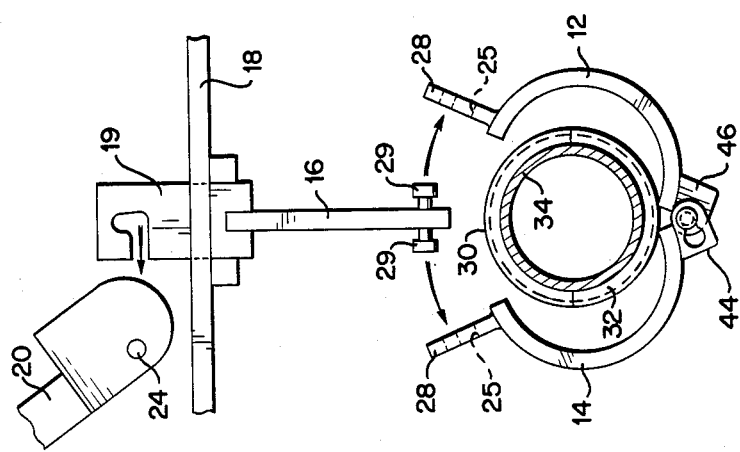

Upon further rotation of the handle 20 to the vertical position, the lifting rod 16 will have dropped sufficiently, as shown in FIG. 3, so that the stepped lugs 29 with larger diameter outer end portions are aligned with the large diameter portion in the lower end of holes 25 in the bearing brackets 28, thus allowing the bracket flanges 28 on the upper ends of bearing sleeve halves 12 and 14 to be free to move outwardly upon rotation around stepped lug 40 with larger diameter outer end portion, as shown in FIG. 4. The bearing sleeves 12, 14 may then be swung open, allowing removal of the upper 30 and lower 32 bearing halves which fit closely around the screw conveyor shaft 34. At this point, all components are now accessible for washdown or maintenance. Due to the presence of the slot 42 with enlarged end portion, the lug 40 may then be disengaged from the slot 42 so that the halves 12 and 14 may be separated, as shown in FIG. 5.

In one embodiment, the auger screw flighting 35 was of 12 inch diameter and the screw shaft 34 was of 3 inch diameter. In this embodiment, the shaft 34 and flighting 35 moved downwardly about ⅜ inch upon initial rotation of the handle 20, at which point the flighting 35 made contact with the trough 15. As the handle 20 continued to be rotated, the rod 16 dropped another ⅜ inch to a point at which the lugs 29 are aligned with the large diameter portion of slotted holes 25. Once the weight of the auger shaft 34 and flightings 35 was removed from the rod 16, the handle 20 could be completely removed as shown in FIG. 4.

Figure 5:
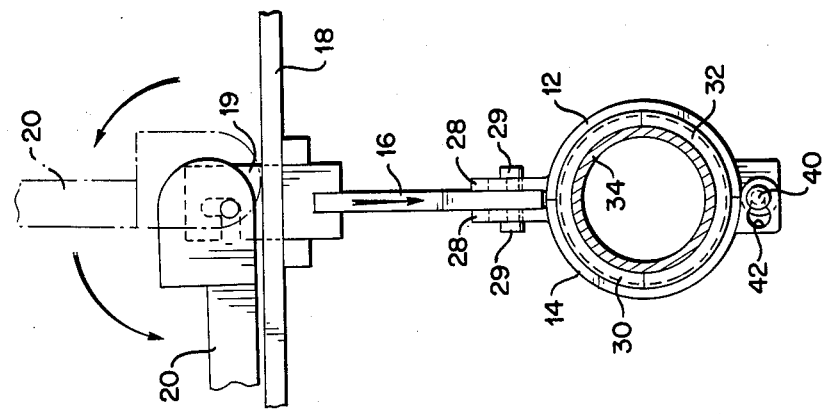

The configuration of the stepped lug 40, slot 42 and hinge brackets 44 and 46 allows the bearing sleeve halves 12 and 14 to be swung away from the stepped lugs 29, as shown in FIG. 4, and then bearing halves 30 and 32 may be separated, as shown in FIG. 5.

In the re-assembly of the sanitary hanger bearing assembly 10 of the present invention from the disassembled condition of FIG. 5, the upper and lower bearing halves 30, 32, which may be formed of a plastic such as nylon, are installed on the shaft 34 or on the interior of the sleeve halves 12 and 14, and the sleeve halves 12 and 14 are then swung around and reinstalled on the lugs 29. The lifting rod 16 is then raised by rotation of the handle 20 whereupon the shaft 34 with flighting 35 will be lifted back into position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A sanitary hanger bearing assembly for use with a screw conveyor wherein a screw conveyor shaft is mounted within a trough having a cross bar member extending across the upper end of said trough, comprising:
   a lifting rod member for mounting vertically in said trough, said lifting rod having a pair of lugs extending outwardly in opposite directions from the lower end thereof;
   an elongated handle member pivotally mounted at the upper end of said lifting rod, said handle member having a cam-shaped surface on one end thereof for contact with said cross bar;
   a pair of arcuate bearing sleeve members pivotally attached to each other at one end and with the opposite end of each bearing sleeve member having a bracket flange mounted thereon, each bracket flange having an opening therein for receiving a respective lug of said lifting rod; and
   a pair of bearing halves for providing a close fit around said screw conveyor shaft, said bearing halves being received within said bearing sleeve members.

2. The sanitary hanger bearing assembly of claim 1 wherein said lifting rod lugs are stepped lugs each having an outer end portion of larger diameter than the inner portion thereof.

3. The sanitary hanger bearing assembly of claim 2 wherein said holes in the bracket flanges have a large diameter portion in the lower end thereof which aligns with said stepped lugs of the lifting rod when said lifting rod is lowered due to rotation of the handle with cam-shaped end surface.

4. The sanitary hanger bearing assembly of claim 3 wherein said arcuate bearing sleeve members are pivotally connected by a stepped lug mounted on one sleeve member which engages a slot in the other sleeve member, said slot having an enlarged end portion through which said lug may be disengaged.

5. The sanitary hanger bearing assembly of claim 3 wherein said screw conveyor shaft is provided with flightings extending through said trough, the dimensions of said flightings, lifting rod and handle being such that, upon initial rotation of said handle, the lifting rod moves vertically downward an initial distance which causes the flightings to drop a sufficient distance so that said flightings are supported by the trough and wherein further rotation of said handle causes the lifting rod to move farther downwardly so as to align the stepped lugs of the lifting rod with said large diameter portions of the holes in said bracket flanges.

* * * * *